(12) United States Patent
Rigby et al.

(10) Patent No.: US 8,364,591 B2
(45) Date of Patent: Jan. 29, 2013

(54) TRACK DATA MAPPING SYSTEM FOR PROCESSING OF PAYMENT TRANSACTION DATA

(75) Inventors: Mark Rigby, Rickmansworth (GB); Simon Hurry, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 86 days.

(21) Appl. No.: 12/853,010

(22) Filed: Aug. 9, 2010

(65) Prior Publication Data

US 2011/0087593 A1 Apr. 14, 2011

Related U.S. Application Data

(60) Provisional application No. 61/232,584, filed on Aug. 10, 2009.

(51) Int. Cl.
*G06Q 40/00* (2012.01)
(52) U.S. Cl. ................. 705/40; 705/35; 705/39
(58) Field of Classification Search .............. 705/35, 705/38, 40; 707/101
See application file for complete search history.

(56) References Cited

U.S. PATENT DOCUMENTS

| | | | |
|---|---|---|---|
| 5,999,937 A | 12/1999 | Ellard | |
| 6,427,151 B1 * | 7/2002 | Chan et al. ........................... | 1/1 |
| 6,857,566 B2 * | 2/2005 | Wankmueller ................ | 235/380 |
| 2005/0038736 A1 * | 2/2005 | Saunders ...................... | 235/380 |
| 2007/0294182 A1 | 12/2007 | Hammad | |
| 2008/0029593 A1 | 2/2008 | Hammad et al. | |
| 2010/0211422 A1 * | 8/2010 | Zanzot et al. ..................... | 705/7 |

FOREIGN PATENT DOCUMENTS

| | | |
|---|---|---|
| KR | 10-2003-0080407 A | 10/2003 |
| WO | 2008-059465 A2 | 5/2008 |

OTHER PUBLICATIONS

International Search Report and Written Opinion mailed Feb. 23, 2011 in PCT/US2010/045071 filed Aug. 10, 2010, 10 pages.

* cited by examiner

*Primary Examiner* — Jagdish Patel
(74) *Attorney, Agent, or Firm* — Kilpatrick Townsend & Stockton LLP

(57) ABSTRACT

Systems and associated apparatuses and methods for processing payment transactions. A merchant's data processing system may provide payment transaction data in a first format (e.g., Track 1) to a payment processing network. The payment processing network may determine the issuer to which the data will be provided as part of a process for authorizing the payment transaction. It is determined if the issuer is one that is expecting or requires that the data be provided in a second format (e.g., Track 2). If the issuer is one that is expecting or requires that the transaction data be supplied in the second format, then it is determined if the issuer is enrolled in the appropriate data mapping service. If the issuer is enrolled in the data mapping service, then the inventive system performs the data mapping processes needed to provide the data in the second format to the issuer. The issuer may then use the received data to determine whether to authorize the payment transaction.

21 Claims, 5 Drawing Sheets

TRACK DATA MAPPING SYSTEM FOR PROCESSING OF PAYMENT TRANSACTION DATA

CROSS-REFERENCE TO RELATED APPLICATION

This application claims priority from U.S. Provisional Patent Application No. 61/232,584, filed Aug. 10, 2009 the contents of which are incorporated herein by reference in their entirety for all purposes.

BACKGROUND

Embodiments of the present invention are directed to systems, apparatuses, and methods for the processing of payment transaction data, and more specifically, to the mapping of data between two data tracks used to represent cardholder and account data on credit cards, debit cards, and other types of payment devices.

Consumer payment devices such as debit cards or credit cards are used by millions of people worldwide to facilitate various types of commercial transactions. In a typical transaction involving the purchase of a product or service at a merchant location, the payment device is presented at a point of sale terminal ("POS terminal") located at a merchant's place of business. The POS terminal may be a card reader or similar device that is capable of accessing data stored on the payment device, where this data may include a consumer's identification data, authentication data, or account data, for example. Some or all of the data read from the payment device is provided to the merchant's transaction or data processing system and then to the acquirer, which is typically a bank or other institution that manages the merchant's account. The data provided to the acquirer may then be provided to a payment processing network (e.g., a system that includes an element that functions as a payment processor) which processes the data to assist in determining if the transaction should be authorized, and assists in the clearance and account settlement functions for the transaction. The authorization decision, clearance, and settlement portions of the transaction may also involve communication and/or data transfer between the payment processing network and the bank or institution that issued the payment device to the consumer (referred to as the issuer).

When a POS terminal or other form of device reader accesses the data on or stored in a payment device such as a credit card, debit card, or contactless payment device, it typically accesses account data or consumer identification data that is stored in a standardized format. This data is provided by the merchant to an acquirer for use in processing the payment transaction, such as by generating a request to authorize the transaction. Typically, there are two formats or data structures in which the data contained in a portable consumer device may be stored and can be sent to an acquirer. These formats are termed "Track 1" and "Track 2", and typically correspond to a first data format and a second data format. Track 1 stores more information than Track 2, and contains the account holder's name as well as their account number and other discretionary data. This track is sometimes used by the airlines when obtaining reservation information using a credit card. Track 2 is currently the most commonly used data track for payment transactions. This data track contains the cardholder's account number, PIN verification field, plus other discretionary data. Track 2 as well as Track 1 in some situations are read by ATMs and credit card readers or point of sale terminals.

Data read from a payment device is provided to a merchant's acquirer and then to a payment processing network, for eventual use by the issuer of the payment device as part of authorizing or declining the payment transaction. In most cases, the issuer is expecting to receive the data in one or the other of the two standard formats, with the format expected depending upon the location of the issuer. For example, issuers located within the United States typically expect to receive data in the Track 1 format, while issuers located outside the United States may expect to receive data in the Track 2 format. This can create an inability to process the transaction data (or other problems) when a merchant data processing system sends data for use in authorizing a payment transaction in the Track 1 format to an issuer expecting to receive data in a Track 2 format. Such a situation may arise, for example, when a consumer uses a payment device issued by an issuer located outside of the United States to conduct a payment transaction inside the United States. In addition, in the case of some payment devices such as certain contactless chips or chip cards, the device may only contain Track 2 data (which may be stored in a memory location identified by a label or "tag"). In such cases, a merchant data processing system may provide the payment processing network with pseudo Track 1 data constructed from the Track 2 data and other information on the chip or card, but does not provide the payment processing network with the actual Track 2 data. This can also create problems for an issuer when they receive the data and attempt to process a transaction authorization request or other aspect of the transaction.

In view of the foregoing, it is desirable to have a system and associated apparatuses and methods for processing payment transaction data that includes the ability to perform a mapping of data in a Track 1 format to data in a Track 2 format. This would enable issuers expecting Track 2 data to process payment transaction data in situations where a merchant provides data in the Track 1 format. Embodiments of the invention are directed toward solving these and other problems individually and collectively.

SUMMARY

Embodiments of the present invention are directed to systems and associated apparatuses and methods for processing payment transactions. In such transactions, a merchant's data processing system may provide payment transaction data in a first format (e.g., Track 1) to a payment processing network or system. The payment processing network or system may determine the issuer to which the data will be provided as part of a process for authorizing the payment transaction. Once the issuer is identified, it is determined if the issuer is one that is expecting or requires that the data be provided in a second format (e.g., Track 2). If the issuer is one that is expecting or requires that the transaction data be supplied in the second format, then it is determined if the issuer is enrolled in the appropriate data mapping service. If the issuer is enrolled in the data mapping service, then the inventive system will perform the data mapping processes needed to provide the data in the second format to the issuer. The issuer may then use the received data to determine whether to authorize the payment transaction and/or to perform other functions or operations associated with processing the payment transaction.

In one embodiment, the present invention is directed to an apparatus for processing a payment transaction, where the apparatus includes an electronic processor programmed to execute a set of instructions, a data storage device coupled to the processor, and the set of instructions contained in the data storage device, wherein when the set of instructions are executed by the processor, the apparatus processes the payment transaction by:

receiving an authorization request message for the payment transaction;

processing the authorization request message to determine an issuer for a payment account used for the payment transaction;

determining if the issuer is enrolled in a transaction data mapping service;

mapping data contained in the authorization request message from a first format in which the data is provided in the authorization request message to a second format if the issuer is enrolled in the transaction data mapping service; and providing the authorization request message containing the data in the second format to the issuer.

In another embodiment, the present invention is directed to a method of processing a payment transaction, where the method includes receiving an authorization request message for the payment transaction, processing the authorization request message to determine an issuer for a payment account used for the payment transaction, determining if the issuer is enrolled in a transaction data mapping service, if the issuer is enrolled in the transaction data mapping service, then mapping data contained in the authorization request message from a first format in which the data is provided in the authorization request message to a second format, and providing the authorization request message containing the data in the second format to the issuer.

In yet another embodiment, the present invention is directed to an apparatus for processing a payment transaction, where the apparatus includes an electronic processor programmed to execute a set of instructions, a data storage device coupled to the processor, and the set of instructions contained in the data storage device, wherein when the set of instructions are executed by the processor, the apparatus processes the payment transaction by:

receiving an authorization request message for the payment transaction;

processing the authorization request message to determine an issuer for a payment account used for the payment transaction;

determining if the issuer expects to receive data contained in the authorization request message in a Track 2 format;

providing the authorization request message to the issuer if the issuer expects to receive the data contained in the authorization request message in the Track 2 format and the data is in that format;

determining if the issuer is enrolled in a transaction data mapping service if the issuer expects to receive the data contained in the authorization request message in the Track 2 format and the data is in a Track 1 format;

declining the transaction if the issuer is not enrolled in the transaction data mapping service;

mapping the data contained in the authorization request message from the Track 1 format to the Track 2 format if the issuer is enrolled in the transaction data mapping service; and providing the authorization request message containing the data in the Track 2 format to the issuer.

Other objects and advantages of embodiments of the present invention will be apparent to one of ordinary skill in the art upon review of the detailed description of the present invention and the included figures.

DETAILED DESCRIPTION

Embodiments of the present invention are directed to systems used for the processing of payment transactions. Such systems typically acquire data from a consumer's payment device and use that data to generate a request to authorize a payment transaction. The request contains data that is used by the issuer of the payment device to determine whether or not to authorize the transaction. The payment device may take any suitable form, including but not limited to, a credit card, a debit card, a smart card, a device such as a mobile phone or PDA containing a contactless element that functions as a payment device, etc. In some cases, the payment device may contain data used to generate the authorization request that is in a single format, and in other cases the data may be present in more than one format. Depending upon the format in which an issuer expects to receive the data, the data may need to be mapped from a first format to a second format prior to being provided to the issuer. The present invention provides an efficient way to implement a mapping service for payment transaction data and can be used to facilitate payment transactions in situations in which such transactions would otherwise not be possible. The inventive system may therefore provide consumers and issuers with the ability to perform payment transactions in situations in which they would otherwise be prevented from conducting those transactions.

Embodiments of the present invention are typically implemented in the context of a payment transaction, and specifically, in the context of the processing of transaction data as part of a transaction authorization process. Therefore, prior to describing one or more embodiments of the invention in greater detail, a brief discussion of the entities involved in processing and authorizing a payment transaction and their roles in the processing of payment transaction data, will be presented.

Figure 1:
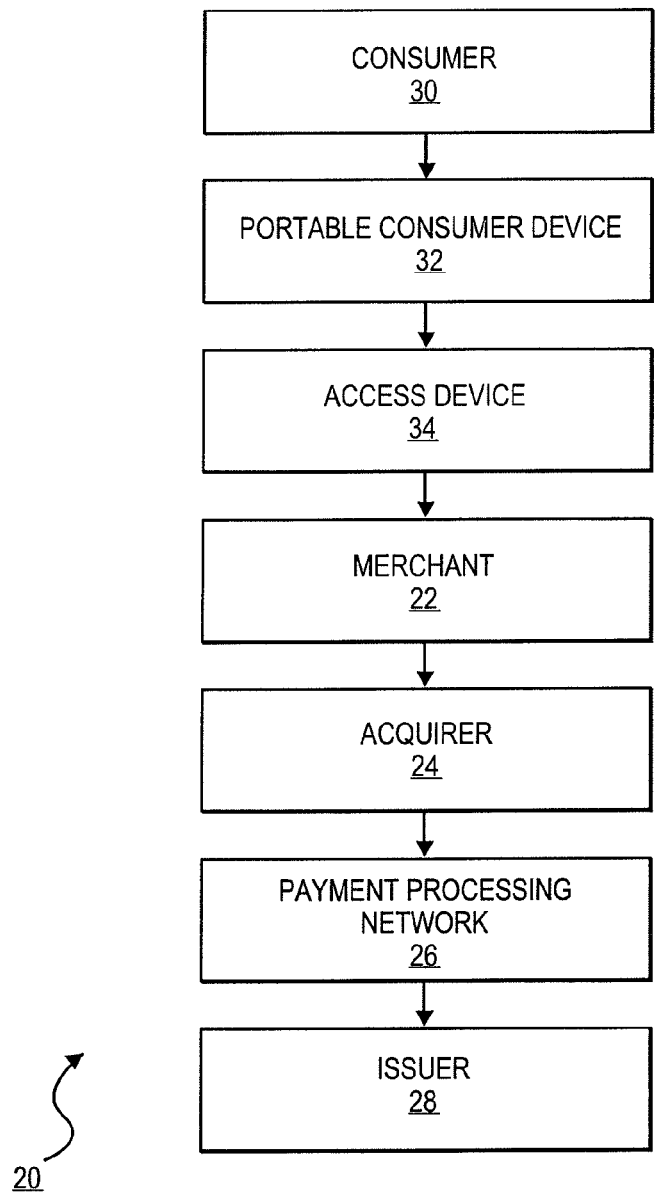
FIG. 1 is a diagram illustrating the primary functional elements of a system for conducting a payment transaction and processing payment transaction data that may be used in implementing an embodiment of the present invention.

FIG. 1 is a diagram illustrating the primary functional elements of a system 20 for conducting a payment transaction and processing payment transaction data that may be used in implementing an embodiment of the present invention. Typically, an electronic payment transaction is authorized if the consumer conducting the transaction is properly authenticated (i.e., their identity and their valid use of a payment account is verified) and has sufficient funds or credit to conduct the transaction. Conversely, if there are insufficient funds or credit in the consumer's account, or if the consumer's payment device is on a negative list (e.g., it is indicated as possibly having been stolen), then an electronic payment transaction may not be authorized. In the following description, an "acquirer" is typically a business entity (e.g., a commercial bank) that has a business relationship with a particular merchant. An "issuer" is typically a business entity (e.g., a bank) which issues a payment device such as a credit card, debit card, smart card, or contactless device to a consumer. Some entities may perform both issuer and acquirer functions.

As shown in FIG. 1, in a typical transaction, a consumer 30 wishing to purchase a good or service from a merchant provides transaction data that may be used as part of a transaction authorization process, typically by means of a portable consumer device 32 that is capable of functioning as a payment device. Consumer 30 may utilize a portable payment device 32 such as a card having a magnetic strip encoded with account data or other relevant data (e.g., a standard credit or debit card) to initiate the transaction. In an E-Commerce (electronic commerce) transaction, the consumer may enter data into a consumer device capable of communicating with a merchant or other element of system 20, such as a laptop or personal computer. The consumer may also initiate the transaction using data stored in and provided from a suitable form of data storage device (such as a smart card, mobile phone or PDA containing a contactless element, or transportable memory device). As examples, a card or similar payment device may be presented to a point of sale terminal which scans or reads data from that card. Similarly, a consumer may enter payment account data into a computing device as part of an E-Commerce transaction. Further, a consumer may enter payment account data into a cell phone or other device capable of wireless communication (e.g., a laptop computer or personal digital assistant (PDA)) and have that data communicated to the merchant, merchant's data processing system, or transaction authorization network by the device. A wireless device may also be used to initiate a payment transaction by means of communication with a merchant device reader or point of sale terminal using a near field communications (NFC) or short range communications mechanism, such as RF, infra-red, optical, etc. Thus, in some cases an access device 34 may be used to read, scan, or otherwise interact with a consumer's portable payment device and thereby obtain data used in conducting a payment transaction.

The payment account data (and if needed for processing the transaction, other consumer data) is obtained from the consumer's device and provided to the merchant 22 or to the merchant's data processing system. The merchant or merchant's data processing system generates a transaction authorization request message that may include data obtained from the consumer's payment device as well as other data related to the transaction and the merchant. As part of generating the authorization request message, the merchant 22 or the merchant's transaction data processing system may access a database which stores data regarding the consumer, the consumer's payment device, and the consumer's transaction history with the merchant. The merchant transaction data processing system typically communicates with a merchant acquirer 24 (e.g., a commercial bank which manages the merchant's accounts) as part of the overall transaction authorization process. The merchant's transaction data processing system and/or merchant acquirer 24 provide data to Payment Processing Network 26, which among other functions, participates in the clearance and settlement processes which are part of the overall transaction processing. As part of the transaction authorization process, an element of Payment Processing Network 26 may access an account database which contains information regarding the consumer's payment history, chargeback or dispute history, credit worthiness, etc. Payment Processing Network 26 communicates with issuer 28 as part of the authorization process, where issuer 28 is the entity that issued the payment device to the consumer and manages the consumer's account. Consumer account data is typically stored in a consumer database which is accessed by issuer 28 as part of the transaction authorization and account management processes.

In standard operation, an authorization request message is created during a consumer purchase (or proposed purchase) of a good or service at a point of sale (POS). The point of sale may be a merchant's physical location or a virtual point of sale such as a web-site that is part of an E-commerce transaction. In a typical transaction, the authorization request message is sent from the point of sale (e.g., the merchant or merchant's transaction data processing system) to the merchant's acquirer 24, then to the Payment Processing Network 26, and then to the appropriate issuer 28. An authorization request message can include a request for authorization to conduct an electronic payment transaction. It may include one or more of an account holder's primary account number (PAN), payment device expiration ate, currency code, sale amount, merchant transaction stamp, acceptor city, acceptor state/country, etc. An authorization request message may be protected using a secure encryption method (e.g., 128-bit SSL or equivalent) in order to prevent data from being compromised. At least some of the account or consumer data contained in the authorization request is obtained from the consumer's payment device, which as noted, typically stores that data in one or more standardized formats (e.g., in a Track 1 format and/or Track 2 format). In generating the authorization request message, the data obtained from the consumer's payment device is typically provided in the format in which it is stored in the payment device.

Portable consumer device 32 may be in any suitable form that can function as a payment device or that may incorporate a payment device. For example, suitable portable consumer devices can be hand-held and compact so that they can fit into a consumer's wallet and/or pocket (e.g., pocket-sized). They may include contact or contactless smart cards, credit or debit cards (typically with a magnetic strip and without an embedded microprocessor), keychain devices (such as the Speedpass™ commercially available from Exxon-Mobil Corp.), and depending upon the specific device, may incorporate a contactless element that is configured to enable it to function as a payment device. Other examples of suitable portable consumer devices include cellular phones, personal digital assistants (PDAs), pagers, payment cards, security cards, access cards, smart media, transponders, and the like, where such devices may incorporate a contactless element. The portable consumer devices can function as a debit device (e.g., a debit card), a credit device (e.g., a credit card), or a stored value devices (e.g., a stored value or prepaid card).

Payment Processing Network 26 may include data processing subsystems and networks, and be configured to implement operations used to support and deliver authorization services, exception file services, and clearing and settlement services. An exemplary payment processing network may include VisaNet. Payment processing networks such as VisaNet are able to process credit card transactions, debit card transactions, and other types of commercial transactions. VisaNet, in particular, includes a VIP system (Visa Integrated Payments system) which processes authorization requests for transactions and a Base II system which performs clearing and settlement services for the transactions.

Payment Processing Network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. Payment Processing Network 26 may use any suitable wired or wireless network, including the Internet, to facilitate communications and data transfer between its component system elements.

As described, when a portable consumer device such as a credit or a debit card is used to perform a payment transaction, data contained in the portable consumer device is sent by a merchant to an acquirer, typically by incorporating some or all of that data into an authorization request message for the transaction. Typically, there are two formats in which the data contained in a portable consumer device can be sent to an acquirer. These formats are the previously described Track 1 and Track 2 formats. When either one or both of Track 1 or Track 2 data is sent from an acquirer to a payment processing network such as VisaNet, the payment processing network will typically send that data format (i.e., Track 1 or Track 2) to the appropriate issuer. As noted, this can create a problem if the issuer receives a data format that is different from what it is expecting or is capable of processing. For example, in the United States, merchants typically send Track 1 data to the payment processing network to forward to the issuer for authorization of a transaction, whereas outside the United States, merchants typically send Track 2 data. This may create a problem when an issuer outside the United States receives data from a transaction conducted inside the United States.

As recognized by the inventors of the present invention, it would be beneficial if the payment processing network or system (or an element of that network or system) could, where needed, provide a service to map or otherwise translate the data received from a portable consumer device from a Track 1 format to a Track 2 format. This would enable the proper processing of transaction data, including transaction authorization request messages, by issuers that are not capable of properly processing payment transaction data in the Track 1 format.

Figure 2:
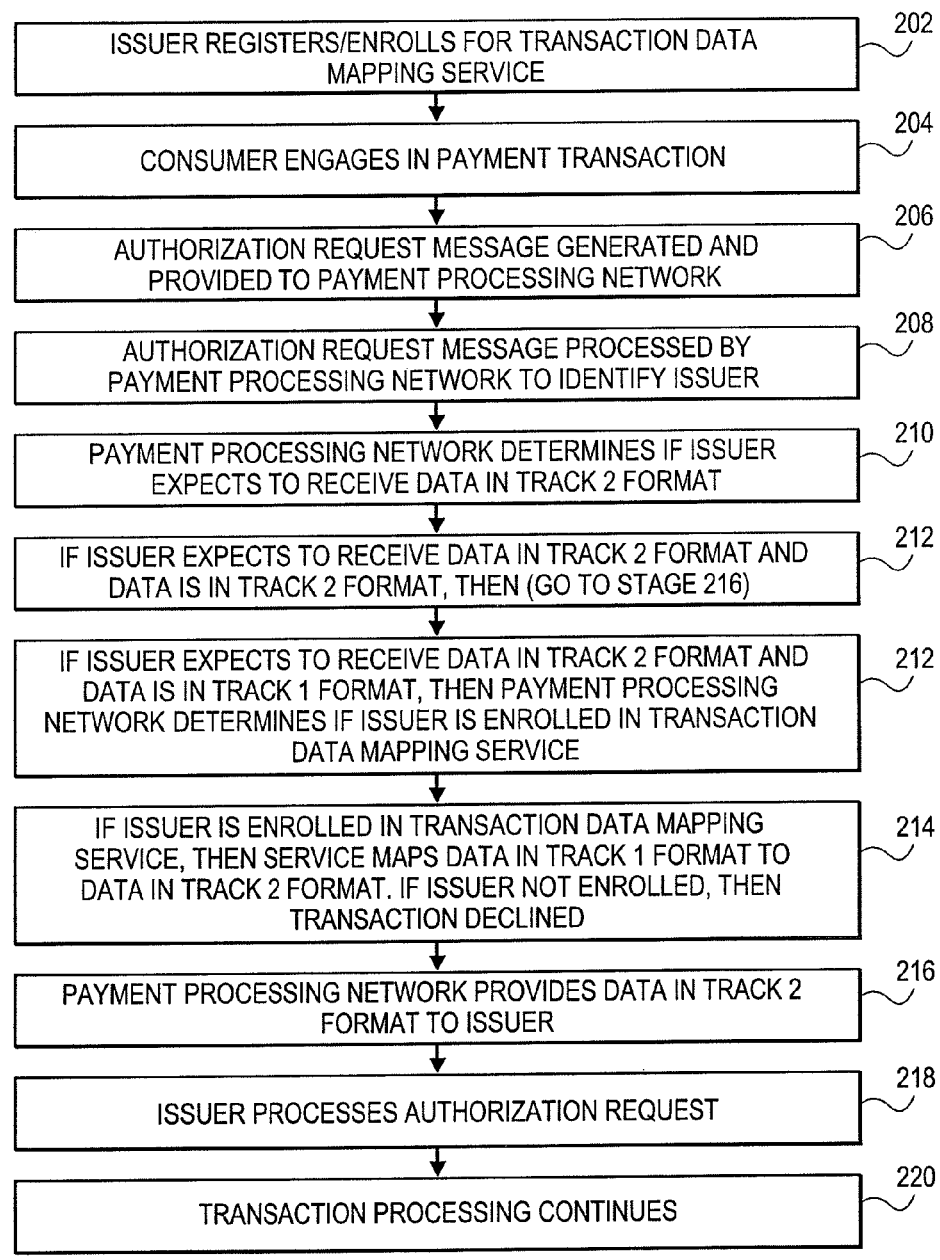
FIG. 2 is a flowchart illustrating a process for processing payment transaction data that includes mapping Track 1 data to Track 2 data, in accordance with some embodiments of the present invention.

FIG. 2 is a flowchart illustrating a process 200 for processing payment transaction data that includes mapping Track 1 data to Track 2 data, in accordance with some embodiments of the present invention. Although the process or method described with reference to FIG. 2 is typically implemented by an element of payment processing network 26 of FIG. 1 or payment processing network 404 of FIG. 4 (such as a payment processor/computer that is programmed to execute instructions to implement a transaction data mapping or transaction authorization process), the process or method may also be implemented by other elements of a transaction processing, data processing, or transaction authorization system. The method or process stages described with reference to FIG. 2 may be implemented as part of a larger method or process, as additional process steps or stages may be added without departing from the concept of the invention. Further, the inventive method or process may be executed as a standalone routine or as a part of a larger routine. Although typically implemented as a set of instructions stored in a memory or data storage device and executed in whole or in part by a programmed processor or computing device, the inventive method or process may also be implemented as a set of logic gates or other form of hardware. The set of instructions may also be stored on a computer-readable medium that may be accessed by a processor or computing device.

As shown in the figure, in some embodiments, the inventive transaction data mapping process begins when an issuer registers or enrolls in the transaction data mapping service (stage 202). Registration or enrollment of an issuer can be performed by any suitable method including, but not limited to, entering data into a form or application using a web-site provided by an element of the payment processing network, sending an enrollment message to an element of the payment processing network, etc. Note that although enrollment in the mapping service is described as being performed prior to initiation of a payment transaction in which the mapping functions are performed, in some embodiments it may not be necessary that enrollment or registration occur prior to the transaction. For example, in some embodiments, an issuer that is not registered or enrolled in the mapping service may be alerted to the need for certain transaction data to be mapped from Track 1 to Track 2 based on receipt of the transaction data in Track 1 format (typically as part of a transaction authorization request message) and identification of the issuer as requiring data in the Track 2 format. In such a situation, a message could be provided to the issuer informing them of the potential problem and requesting authorization to enroll the issuer in the mapping service, either for a trial period or for an extended period. As an alternative, the mapping functions could be performed on the Track 1 data and the Track 2 data could be provided to the issuer along with an explanation of the mapping service and a link to a web-site containing an enrollment application for the service.

Regardless of the manner in which an issuer is enrolled or registered for the mapping service, and whether such enrollment occurs prior to, contemporaneous with, or subsequent to receipt of an authorization request message or payment transaction data by the payment processing network, the use of the mapping service is typically initiated when a consumer engages in a payment transaction (stage 204). As described, such a transaction may be initiated by a consumer presenting their payment device to a merchant, typically by means of an access device such as a point of sale terminal or device reader. The payment device may be of any suitable form including, but not limited to, a credit card or debit card that is equipped with a magnetic stripe on which is encoded account and cardholder data, a smart card in which is embedded a contactless chip that includes a data storage element in which is stored account and cardholder data, or a portable device such as a mobile phone, PDA, or portable computer in which is incorporated a contactless chip or similar element.

The point of sale terminal or device reader accesses the account and/or cardholder data stored in the payment device and that data is used to generate an authorization request message for the payment transaction. The authorization request message may be generated by the terminal or reader or by another element of the merchant's transaction data processing system. The authorization request message is provided to the merchant's acquirer and from the acquirer to the payment processing network (stage 206). The authorization request message contains data concerning the payment account, the transaction, and/or the cardholder, with the data typically being in either Track 1 or Track 2 format depending upon the format in which the data was stored in (or on) the consumer's payment device. For example, in the case of a credit or debit card being used for the transaction, a magnetic stripe may be encoded with data in one or both of the formats. Even though both formats of data may be available, depending upon the location in which the transaction is occurring, the authorization message may be constructed using only the Track 1 format. In other cases, such as for some contactless payment devices, the data may only be available in Track 1 format or the authorization request message may contain data in a pseudo Track 1 format that has been constructed from a Track 2 format.

The authorization request message is received by the payment processing network and is processed to identify the issuer for the payment account or payment device used for the transaction (stage 208). Typically, the issuer may be identified from a code or data string included in the authorization request. After identifying the issuer, the payment processing network determines if the issuer expects to receive the authorization request message or transaction data in the Track 2 format (stage 210). This may be done by referring to a lookup table, accessing a database, or other form of data record. It may also be based on the location or another characteristic of the issuer. For example, if the issuer is located outside of the United States, then the payment processing network may assume that the issuer is expecting to receive data in the Track 2 format.

If the issuer expects to receive the data in the Track 2 format and the data contained in the authorization request message is in the Track 2 format, then the payment processing network provides the authorization request message to the issuer (stage 212, where as indicated, control is passed to stage 216 of the process). However, if the issuer expects to receive the data in the Track 2 format and the data contained in the authorization request message is in the Track 1 format or pseudo Track 1 format, then the payment processing network determines if the issuer is enrolled in the transaction data mapping service (stage 212). This may be determined by any suitable method, such as accessing a lookup table, a database, or other form of data record to determine if a specific issuer is enrolled or registered for the service. As discussed with reference to stage 202, although enrollment in the mapping service will typically be performed prior to initiation of a payment transaction in which the mapping functions are performed, in some embodiments of the invention enrollment or registration may occur contemporaneous with, or subsequent to receipt of an authorization request message or payment transaction data by the payment processing network.

If the issuer is enrolled in the transaction data mapping service, then the service executes one or more steps, processes, functions, or operations to map the data in the authorization request message from the Track 1 format to the Track 2 format (stage 214). These steps, processes, functions, or operations may be executed by a suitably programmed processor (such as a central processing unit or microprocessor) or computing device. The processor or computing device may be an element of the payment processing network, such as a server that is communicatively coupled to the acquirer by means of a suitable communications network or networks. One embodiment of a process for performing the mapping from a Track 1 data format to a Track 2 data format will be described further with reference to FIG. 3. In some embodiments, if the issuer is not enrolled in the transaction data mapping service, then the transaction may be declined.

After mapping of the data from the Track 1 format to the Track 2 format, the payment processing network provides the data in the Track 2 format to the issuer of the consumer's payment device (stage 216), where as has been described, the data is typically provided as part of a transaction authorization request message. The issuer receives the authorization request containing the data in the Track 2 data format and processes the request (stage 218). The processing of the payment transaction then continues in its normal manner (stage 220). This may include the issuer approving or denying the transaction with that decision contained in an authorization response message that is provided to the payment processing network. The payment processing network forwards the authorization response message to the acquirer, which sends the response message to the merchant. If the transaction is approved, then the subsequent processing of the transaction data may include operations performed for purposes of settling and clearing the transaction.

Table 1 (below) illustrates the data contained in Track 1 for an exemplary format of the data in that track.

TABLE 1

| Field # | Field Name | Length |
| --- | --- | --- |
| Field 1 | Start Sentinel | 1 |
| Field 2 | Format Code | 1 |
| Field 3 | Primary Account Number (PAN) | variable - up to 19 |
| Field 4 | Field Separator | 1 |
| Field 5 | Cardholder Name | variable - 2 to 26 |
| Field 6 | Field Separator | 1 |
| Field 7 | Card Expiration Date | 4 |
| Field 8 | Service Code | 3 |
| Field 9 | PIN Verification field (PIN verification key indicator (PVKI) and PIN verification value (PVV)) | 5 |
| Field 10.1 | Track 1 Discretionary Data | variable |
| Field 10.2 | Contactless Indicator | 1 |
| Field 11.1 | ATC (automatic transaction counter) part 1 | 2 |
| Field 11.2 | dCVV (dynamic card verification value) | 3 |
| Field 11.3 | ATC part 2 | 2 |
| Field 11.4 | Reserved | 1 |
| Field 11.5 | Reserved | 3 |
| Field 12 | End Sentinel | 1 |
| Field 13 | Longitudinal Redundancy Check (LRC) | 1 |

As shown in Table 1, an exemplary Track 1 format may contain 18 fields of data, with each field containing a specific type of data. It is noted that the types of data, the field names, and the data length depicted in the table represent an example of the data that might typically be found in a Track 1 data format for data contained in a payment device. Other field names and field lengths are possible and are considered to be within the underlying concepts of the present invention.

Table 2 (below) illustrates the data contained in Track 2 for an exemplary format of the data in that track.

TABLE 2

| Field Number | Length | Field Name |
| --- | --- | --- |
| 1 | 1 | Start Sentinel |
| 2 | 12 to 19 | Primary Account Number (PAN) |
| 3 | 1 | Separator |
| 4 | 4 | Card Expiration Date |
| 5 | 3 | Service code |
| 6 | 0 or 5 | PIN Verification Data |
| 7 | Varies | Discretionary Data (may include security data such as CVV or dCVV for some types of payment devices) |
| 8 | | End Sentinel |
| 9 | 1 | Longitudinal Redundancy Check (LRC) |

As shown in Table 2, an exemplary Track 2 format may contain 9 fields of data, with each field containing a specific type of data. It is noted that the types of data, the field names, and the data length depicted in the table represent an example of the data that might typically be found in a Track 2 data format for data contained in a payment device. Other field names and field lengths are possible and are considered to be within the underlying concepts of the present invention. Note that for the case of the payment device including a contactless element, the data contained in Track 2 may be contained in a specific memory location identified by a "tag" (e.g., "tag 57") is commonly used to refer to the data storage location in which the Track 2 data or its equivalent is stored).

As is evident from an examination of Table 1 and Table 2, the two data formats (Track 1 and Track 2) contain a different number of fields, some common field names (suggesting a similarity in the type or purpose of the data contained in those fields), and some field names that are not common (suggesting that there is data contained in the Track 1 format that is not present in the Track 2 format, such as the cardholder name). Thus, processing the data contained in Track 1 to obtain data in the Track 2 format is a non-trivial exercise and must be performed carefully.

Figure 3:
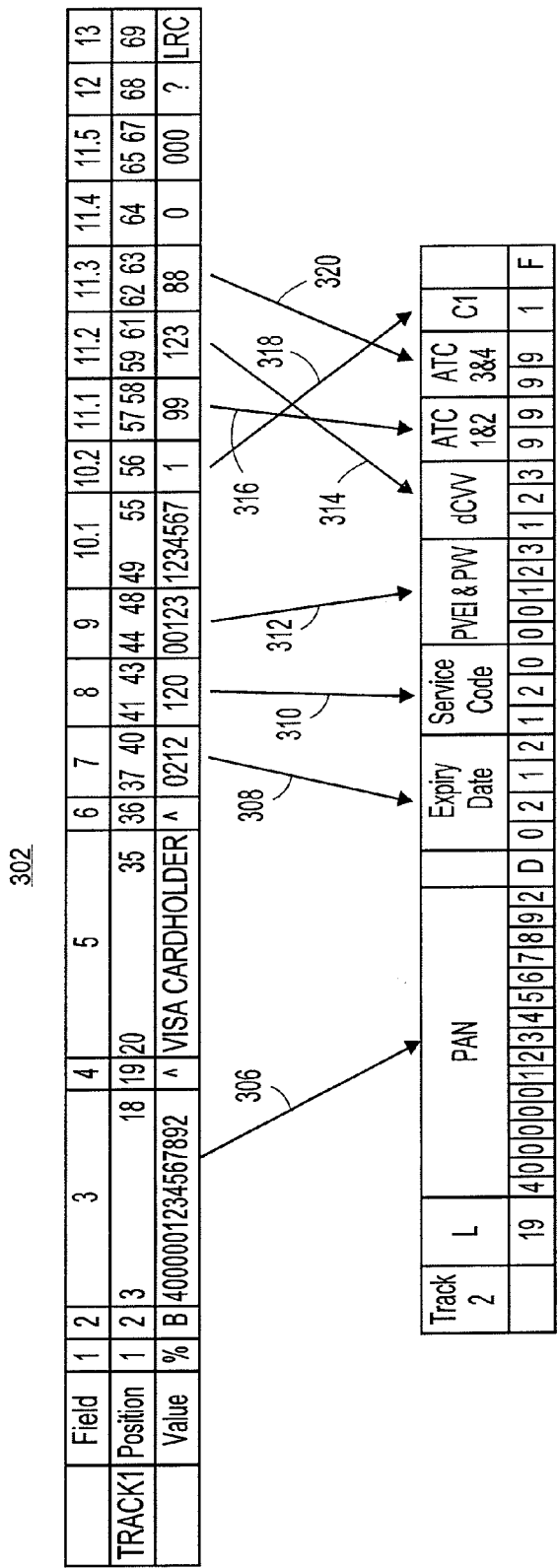
FIG. 3 is a diagram illustrating an exemplary process for mapping the data contained in a Track 1 format to a Track 2 format, in accordance with some embodiments of the present invention.

The following is an example of a method or process for mapping data in the Track 1 format into data in the Track 2 format that may be used in embodiments of the present invention. It is noted that other mapping processes are possible and are understood to fall within the concepts of the invention, where the operations performed by such other processes may depend upon the data or field types present in a data track. The example process is depicted in FIG. 3, which illustrates an exemplary data mapping process for mapping data in a Track 1 format (labeled element 302) to data in a Track 2 format (labeled element 304). In the example mapping process shown in the figure, the following data mapping operations are utilized, where in some embodiments these data mapping operations may be implemented by a suitably programmed data processor, computing device, server, etc.:

Map or transfer the Primary Account Number (PAN) data contained in field 3 of Track 1 to field 2 of Track 2 (identified by arrow 306 in the figure);

Map or transfer the expiration date data contained in field 7 of Track 1 to field 4 of Track 2 (identified by arrow 308 in the figure);

Map or transfer the Service Code data contained in field 8 of Track 1 to field 5 of Track 2 (identified by arrow 310 in the figure);

Map or transfer the PIN verification field data contained in field 9 of Track 1 to field 6 of Track 2 (identified by arrow 312 in the figure); and If fields 10.2, 11.1, 11.2, and 11.3 of Track 1 are populated, then map or transfer the data in those fields into field 7 of Track 2 (having the field name "discretionary data") so that the final arrangement or order of data is as shown in FIG. 3. A possible process for performing this mapping to form field 7 of Track 2 is as follows (note that this part of the mapping process may occur in the situation in which the payment device is a contactless card or chip, in which case the data location identified as "tag 57" is created):

(1) concatenate the data in field 11.2 of Track 1 to the data in field 11.1 of Track 1, with the data in field 11.2 preceding that of field 11.1 (identified by arrows 314 and 316 of the figure);

(2) concatenate the result of (1) to the data in field 11.3 of Track 1, with the data obtained from (1) preceding that of field 11.3 (identified by arrows 314, 316, and 320 of the figure); and (3) concatenate the result of (2) to the data in field 10.2 of Track 1, with the data obtained from (2) preceding that of field 10.2 (identified by arrows 314, 316, 320, and 318 in the figure).

Figure 4:
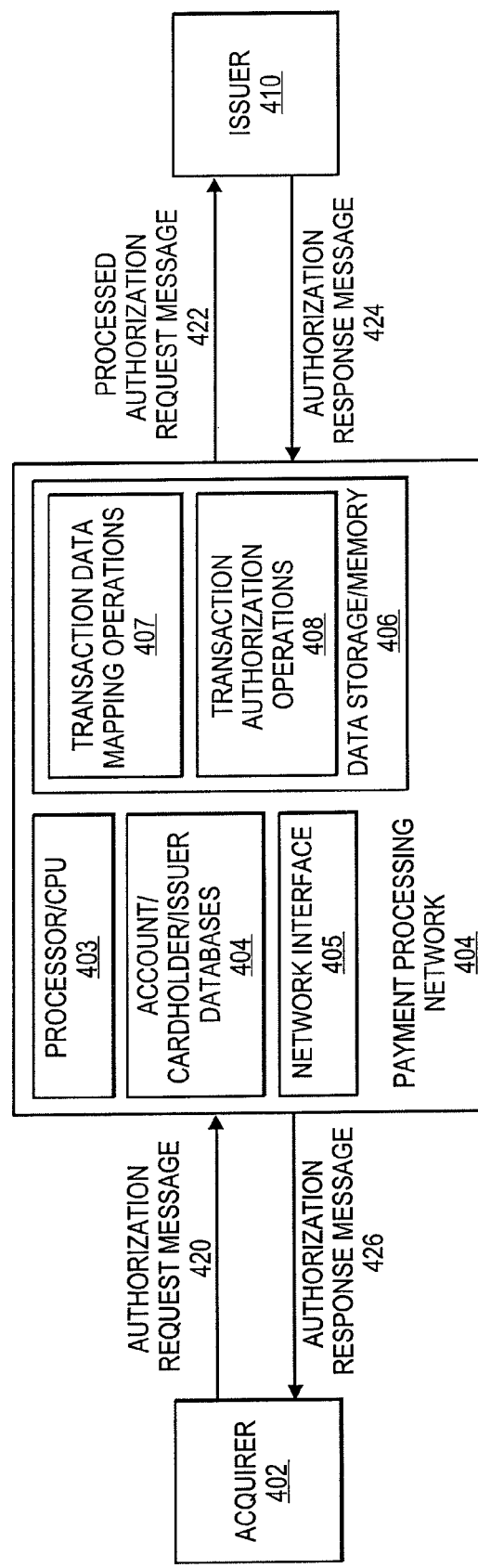
FIG. 4 is a functional block diagram illustrating certain of the components of a system including a payment processing network or system that may be used to implement an embodiment of the transaction data mapping service of the present invention.

FIG. 4 is a functional block diagram illustrating certain of the components of a system 400 including a payment processing network 404 that may be used to implement an embodiment of the transaction data mapping service of the present invention. As shown in the figure, system 400 includes an acquirer 402 which provides an authorization request message 420 for a payment transaction to payment processing network 404. As has been described, authorization request message 420 typically contains data obtained from a consumer's payment device, with that data being provided in accordance with one or more standard formats (e.g., Track 1 and/or Track 2, as have been described with reference to Table 1 and Table 2). In some embodiments of the present invention, payment processing network 404 receives authorization request message 420 and processes message 420 in accordance with the process, method, or operations described with reference to FIG. 2 and FIG. 3.

In processing message 420, payment processing network 404 may utilize one or more of the components or elements depicted in FIG. 4. Such components or elements include a processor or central processing unit 403 that is programmed to execute a set of instructions, where some or all of those instructions may be stored in data storage or memory 406. The instructions may include instructions which when executed, cause payment processing network 404 to perform one or more transaction authorization processing functions or operations (as suggested by instructions or instruction set 408) and/or transaction data mapping functions or operations (as suggested by instructions or instruction set 407). In performing these operations, processor or central processing unit 403 may access one or more databases 404 containing payment account, cardholder, and/or issuer data (such as the previously described lookup table or database containing an index of issuers to enable the payment processing network to determine if a particular issuer is enrolled in the transaction data mapping service). Payment processing network 404 may utilize network interface 405 to enable communication with other elements of the system 400 depicted in FIG. 4. After processing authorization request message 420 (which may include application of the transaction data mapping service), payment processing network 404 provides processed authorization request message 422 to issuer 410. Issuer 410 then determines whether to authorize (i.e., approve) the transaction, or to deny the transaction. Issuer 410 generates an authorization response message 424 containing its approval or denial of the transaction and provides response message 424 to payment processing network 404. Payment processing network 404 may (but is not required to) perform additional processing of response message 424 to generate authorization response message 426 which is provided to acquirer 402.

The system described with reference to FIG. 4 (used in conjunction with the processes described with reference to FIG. 2 and FIG. 3) may be used to implement the processing of a payment transaction and the mapping of data from a Track 1 format to a Track 2 format. This enables an issuer expecting (or only capable of processing) data in the Track 2 format to process the transaction data in situations in which the issuer would otherwise be unable to authorize or process the payment transaction. The inventive system may therefore provide consumers and issuers with the ability to perform payment transactions in situations in which they would otherwise be prevented from conducting those transactions.

Embodiments of the present invention provide an efficient way to implement a mapping service for payment transaction data and can be used to enable payment transactions in situations in which such transactions would otherwise not be possible. The inventive system may therefore provide consumers and issuers with the ability to perform payment transactions in situations in which they would otherwise be prevented from conducting those transactions. In some embodiments, the invention does this by enabling the proper processing of transaction data, including transaction authorization request messages, by issuers that are not capable of properly processing payment transaction data in the Track 1 format. The invention increases the security and reliability of the payment processing network, and the scope of payment transactions that may be conducted by consumers and issuers.

Figure 5:
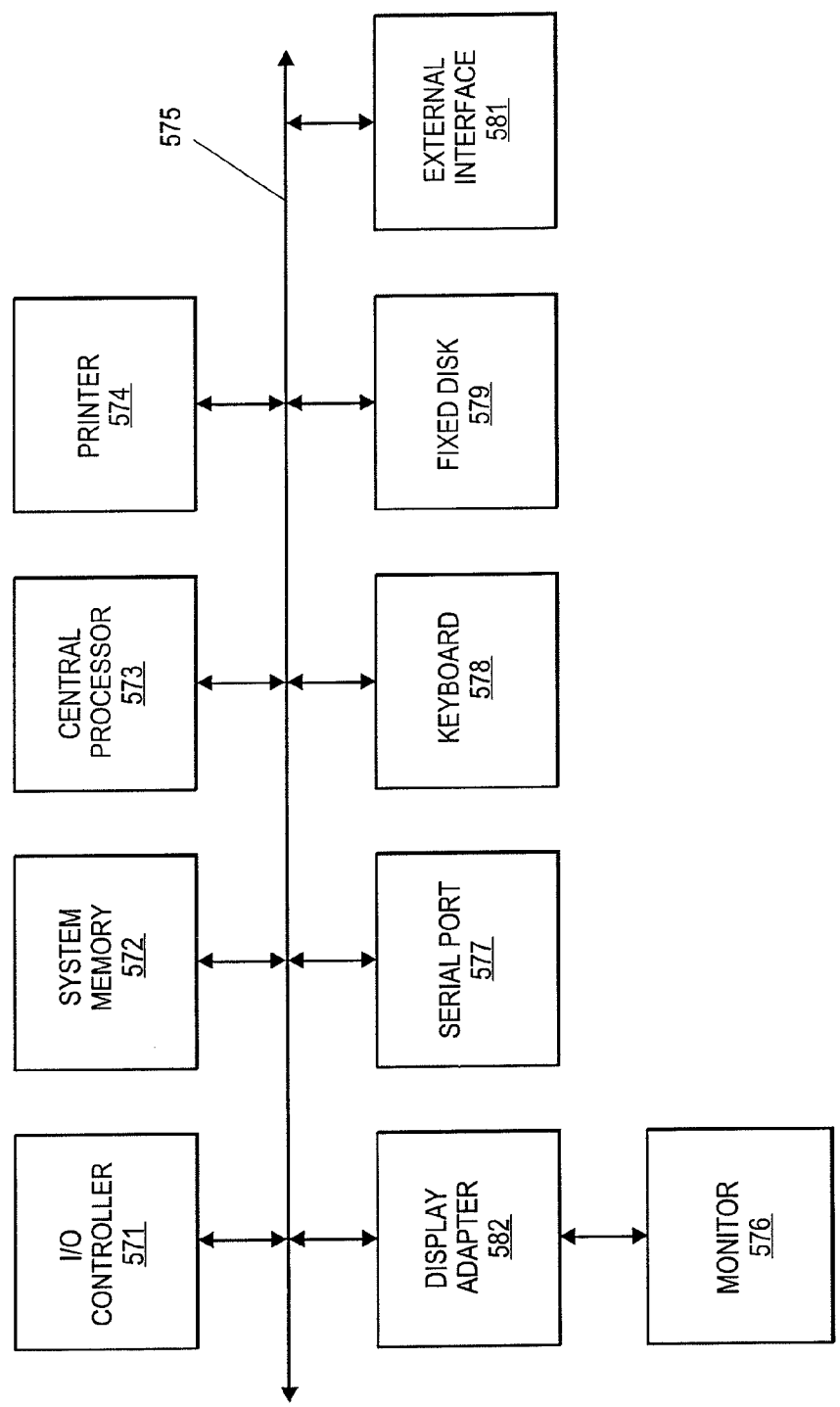
FIG. 5 is a functional block diagram illustrating the primary components of a computing apparatus that may be used to implement an embodiment of the transaction data mapping service of the present invention.

FIG. 5 is a functional block diagram illustrating the primary components of a computing apparatus that may be used to implement an embodiment of the transaction data mapping service of the present invention. Some or all of the components of the computing apparatus depicted in FIG. 5 may be part of a server, group of servers, computer, or computing device that is part of payment processing network 404 of FIG. 4 or payment processing network 26 of FIG. 1, and which implements one or more of the functions, processes, methods, or operations of the payment transaction processing or transaction data mapping service of the present invention. Further, the elements and entities shown in FIG. 1 and FIG. 4 may use any suitable number of subsystems to facilitate the functions described herein, where examples of such subsystems or components are shown in FIG. 5. The subsystems shown in FIG. 5 are interconnected via a system bus 575. Additional subsystems such as a printer 574, keyboard 578, fixed disk 579 (or other memory comprising computer readable media), monitor 576 (which is coupled to display adapter 582), and others are shown. Peripherals and input/output (I/O) devices, which couple to I/O controller 571, can be connected to the computer system by any number of means known in the art, such as serial port 577. For example, serial port 577 or external interface 581 can be used to connect the computer apparatus to a wide area network such as the Internet, a mouse or other input device, or a scanner. The interconnection via system bus 575 allows the central processor 573 to communicate with each subsystem and to control the execution of instructions from system memory 572 or the fixed disk 579, as well as the exchange of information between subsystems. The system memory 572 and/or the fixed disk 579 may embody a computer readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. An apparatus for processing a payment transaction, comprising:
   an electronic processor programmed to execute a set of instructions;
   a data storage device coupled to the processor; and
   the set of instructions contained in the data storage device, wherein when the set of instructions are executed by the processor, the apparatus processes the payment transaction by
      receiving an authorization request message for the payment transaction;
      processing the authorization request message to determine an issuer for a payment account used for the payment transaction;
      determining if the issuer is enrolled in a transaction data mapping service;
      mapping data contained in the authorization request message from a first data format in which the data is provided in the authorization request message to a second data format if the issuer is enrolled in the transaction data mapping service, wherein the first data format is different than the second data format; and
      providing the authorization request message containing the data in the second format to the issuer.

2. The apparatus of claim 1, wherein the first data format of the data is a Track 1 format and the second data format of the data is a Track 2 format.

3. The apparatus of claim 1, wherein the set of instructions further comprise an instruction or instructions which when executed by the processor causes the apparatus to process the payment transaction by:
   declining the transaction if the issuer is not enrolled in the transaction data mapping service.

4. The apparatus of claim 1, wherein the set of instructions further comprise an instruction or instructions which when executed by the processor causes the apparatus to process the payment transaction by:
   after determining the issuer for the payment account, determining if the issuer expects to receive data contained in the authorization request message in a specific format; and
   providing the authorization request message to the issuer if the issuer expects to receive the data contained in the authorization request message in the specific format and the data is in that format.

5. The apparatus of claim 1, wherein the set of instructions further comprise an instruction or instructions which when executed by the processor causes the apparatus to process the payment transaction by:
   mapping one or more of the primary account number (PAN), expiration date, service code, or PIN verification data from the first data format to the second data format.

6. The apparatus of claim 1, wherein the set of instructions further comprise an instruction or instructions which when executed by the processor causes the apparatus to process the payment transaction by:
   mapping one or more of the ATC or dCVV data from the first data format to the second data format.

7. The apparatus of claim 6, wherein the set of instructions further comprise an instruction or instructions which when executed by the processor causes the apparatus to process the payment transaction by:
    mapping the ATC or dCVV data to a discretionary data field of the second format.

8. The apparatus of claim 7, wherein the first data format is a Track 1 format, the second data format is a Track 2 format and the set of instructions further comprise an instruction or instructions which when executed by the processor causes the apparatus to process the payment transaction by:
    mapping the ATC or dCVV data to the discretionary data field of the Track 2 format by
    (a) concatenating the data in field 11.2 of Track 1 to the data in field 11.1 of Track 1, with the data in field 11.2 preceding that of field 11.1;
    (b) concatenating the result of (a) to the data in field 11.3 of Track 1, with the data obtained from (a) preceding that of field 11.3; and
    (c) concatenating the result of (b) to the data in field 10.2 of Track 1, with the data obtained from (b) preceding that of field 10.2.

9. A method of processing a payment transaction, comprising:
    receiving an authorization request message for the payment transaction;
    processing the authorization request message to determine an issuer for a payment account used for the payment transaction;
    determining, by a computer, if the issuer is enrolled in a transaction data mapping service;
    if the issuer is enrolled in the transaction data mapping service, then mapping data contained in the authorization request message from a first data format in which the data is provided in the authorization request message to a second data format, wherein the first data format and the second data format are different; and
    providing the authorization request message containing the data in the second data format to the issuer.

10. The method of claim 9, wherein the first data format of the data is a Track 1 format and the second data format of the data is a Track 2 format.

11. The method of claim 9, further comprising declining the transaction if the issuer is not enrolled in the transaction data mapping service.

12. The method of claim 9, further comprising:
    after determining the issuer for the payment account, determining if the issuer expects to receive data contained in the authorization request message in a specific format; and
    if the issuer expects to receive the data contained in the authorization request message in the specific format and the data is in that format, then providing the authorization request message to the issuer.

13. The method of claim 9, wherein mapping data contained in the authorization request message from the first data format in which it is provided in the authorization request message to the second data format further comprises:
    mapping one or more of the primary account number (PAN), expiration date, service code, or PIN verification data from the first data format to the second data format.

14. The method of claim 9, wherein mapping data contained in the authorization request message from the first data format in which it is provided in the authorization request message to the second data format further comprises:
    mapping one or more of the ATC or dCVV data from the first data format to the second data format.

15. The method of claim 14, further comprising mapping the ATC or dCVV data to a discretionary data field of the second data format.

16. The method of claim 15, wherein the first data format is a Track 1 format, the second data format is a Track 2 format, and mapping the ATC or dCVV data to the discretionary data field of the Track 2 format further comprises:
    (a) concatenating the data in field 11.2 of Track 1 to the data in field 11.1 of Track 1, with the data in field 11.2 preceding that of field 11.1;
    (b) concatenating the result of (a) to the data in field 11.3 of Track 1, with the data obtained from (a) preceding that of field 11.3; and
    (c) concatenating the result of (b) to the data in field 10.2 of Track 1, with the data obtained from (b) preceding that of field 10.2.

17. An apparatus for processing a payment transaction, comprising:
    an electronic processor programmed to execute a set of instructions;
    a data storage device coupled to the processor; and
    the set of instructions contained in the data storage device, wherein when the set of instructions are executed by the processor, the apparatus processes the payment transaction by
        receiving an authorization request message for the payment transaction;
        processing the authorization request message to determine an issuer for a payment account used for the payment transaction;
        determining if the issuer expects to receive data contained in the authorization request message in a Track 2 format;
        providing the authorization request message to the issuer if the issuer expects to receive the data contained in the authorization request message in the Track 2 format and the data is in that format;
        determining if the issuer is enrolled in a transaction data mapping service if the issuer expects to receive the data contained in the authorization request message in the Track 2 format and the data is in a Track1 format;
        declining the transaction if the issuer is not enrolled in the transaction data mapping service;
        mapping the data contained in the authorization request message from the Track 1 format to the Track 2 format if the issuer is enrolled in the transaction data mapping service; and
        providing the authorization request message containing the data in the Track 2 format to the issuer.

18. The apparatus of claim 17, wherein the set of instructions further comprise an instruction or instructions which when executed by the processor causes the apparatus to process the payment transaction by:
    mapping one or more of the primary account number (PAN), expiration date, service code, or PIN verification data from the Track 1 format to the Track 2 format.

19. The apparatus of claim 17, wherein the set of instructions further comprise an instruction or instructions which when executed by the processor causes the apparatus to process the payment transaction by:
    mapping one or more of the ATC or dCVV data from the Track 1 format to the Track 2 format.

20. The apparatus of claim 19, wherein the set of instructions further comprise an instruction or instructions which when executed by the processor causes the apparatus to process the payment transaction by mapping the ATC or dCVV data to a discretionary data field of the Track 2 format.

21. The apparatus of claim 20, wherein the set of instructions further comprise an instruction or instructions which when executed by the processor causes the apparatus to process the payment transaction by:

mapping the ATC or dCVV data to the discretionary data field of the Track 2 format by (a) concatenating the data in field 11.2 of Track 1 to the data in field 11.1 of Track 1, with the data in field 11.2 preceding that of field 11.1;

(b) concatenating the result of (a) to the data in field 11.3 of Track 1, with the data obtained from (a) preceding that of field 11.3; and (c) concatenating the result of (b) to the data in field 10.2 of Track 1, with the data obtained from (b) preceding that of field 10.2.

\* \* \* \* \*